US009953277B2

(12) United States Patent
Mohanty et al.

(10) Patent No.: US 9,953,277 B2
(45) Date of Patent: Apr. 24, 2018

(54) ROLE-ALIGNED COMPETENCY AND LEARNING MANAGEMENT SYSTEM

(75) Inventors: Santosh Kumar Mohanty, Mumbai (IN); Nitin Godbole, Thane (IN); Shailendra Langade, Mumbai (IN)

(73) Assignee: TATA CONSULTANCY SERVICES LTD. (IN)

( * ) Notice: Subject to any disclaimer, the term of this patent is extended or adjusted under 35 U.S.C. 154(b) by 857 days.

(21) Appl. No.: 13/407,216

(22) Filed: Feb. 28, 2012

(65) Prior Publication Data

US 2013/0110733 A1  May 2, 2013

(30) Foreign Application Priority Data

Oct. 27, 2011 (IN) .......................... 3038/MUM/2011

(51) Int. Cl.
*G06Q 10/10* (2012.01)
*G06Q 10/06* (2012.01)

(52) U.S. Cl.
CPC .......... *G06Q 10/06* (2013.01); *G06Q 10/105* (2013.01); *G06Q 10/1053* (2013.01)

(58) Field of Classification Search
CPC ... G06Q 10/1053; G06Q 10/105; G06Q 10/06
USPC .................................................. 705/1.1–912
See application file for complete search history.

(56) References Cited

U.S. PATENT DOCUMENTS

| | | | | |
|---|---|---|---|---|
| 5,416,694 A | * | 5/1995 | Parrish et al. ............... | 705/7.14 |
| 6,049,776 A | * | 4/2000 | Donnelly et al. ........... | 705/7.14 |
| 6,275,812 B1 | * | 8/2001 | Haq et al. .................... | 705/7.14 |
| 7,496,518 B1 | * | 2/2009 | Cayton et al. ............... | 705/321 |
| 8,032,403 B2 | * | 10/2011 | Gremont et al. ............ | 705/7.14 |
| 8,311,865 B2 | * | 11/2012 | Vogel et al. ................. | 705/7.12 |
| 2003/0229529 A1 | * | 12/2003 | Mui et al. ......................... | 705/8 |
| 2012/0130764 A1 | * | 5/2012 | Harthcryde et al. ......... | 705/7.14 |
| 2012/0253879 A1 | * | 10/2012 | Santos et al. ................ | 705/7.22 |

* cited by examiner

*Primary Examiner* — Jonathan P Ouellette
(74) *Attorney, Agent, or Firm* — Barnes & Thornburg LLP

(57) ABSTRACT

Systems and methods for managing and utilizing competencies of employees of an organization are provided. The system comprises a processor and a memory coupled to the processor. The memory comprises a Role Managing Module (RMM) configured to define a set of roles in a database. Each role of the set of roles indicates a functional job in the organization. The RMM is further configured to assign an expected maturity level in a set of knowledge dimensions to each role in the set of roles. The set of knowledge dimensions comprises at least one of a Solution Dimension, a Technology Dimension, a Process Dimension, and an Organization Dimension. The system further comprises a planning module configured to create a career progression plan based on the set of roles. The system further comprises an analysis module configured to cater to organizational requirements of managing employee competencies.

11 Claims, 9 Drawing Sheets

Employee Profile

700

| | | | |
|---|---|---|---|
| Emp Number | | Emp Name | |
| Experience | | Email ID | |
| Designation | | Contact # | |
| BU | | Base Location | |
| | | Last Reviewer | |
| | | New Reviewer | |

| Current Competencies | Current Proficiency | Desired Proficiency (+3N) |
|---|---|---|
| BPM - Integration | E3 | E3 |
| ADM - SOA | E1 | E1 |
| BPM - BPM | E3 | E3 |
| ADM - SaaS | E1 | E1 |
| BPM - EDM | E2 | E3 |
| Foundation - Core Technology - Web Technologies | E3 | E3 |
| Foundation - Core Technology - Design | E4 | E4 |
| Foundation - ITIL - ITIL Concepts | E2 | E3 |
| Foundation - Core Technology - Operating Systems | E3 | E3 |
| Foundation - Core Technology - Web Technologies | E3 | E3 |
| Foundation - ITIL - ITIL Concepts | E1 | E2 |
| IBM - Business Process Management | E3 | E3 |
| IBM - Enterprise Service Bus | E4 | E4 |
| IBM - Websphere Application Server | E4 | E4 |
| Oracle - BEA Weblogic Application Server | E3 | E3 |

Figure 7A

Career Progression Plan — 702

| Target | Community Area | Proficiency | Role |
|---|---|---|---|
| Learning - Self Learning (T) | ADM - SaaS - SaaS | E2 | |
| Learning - Self Learning (S) | Foundation - SDLC - ITIL | E2 | |
| Learning - Conference Preparation | Enterprise Architecture | E3 | |
| Learning - Conference Review | ADM - SOA - SOA | E3 | |
| Learning - Courseware Creation | | | |
| Learning - Course Faculty | Enterprise Architecture | E2 | |
| Experience - Consulting | | | |
| Experience - Application Delivery | | | |
| Experience - Application Management | | | |
| Service - Proof of Concept | Enterprise Architecture | | Enterprise Architect |
| Service - Community Support | Enterprise Architecture | | Enterprise Architect |
| Service - Offering Creation | Enterprise Architecture | | Enterprise Architect |
| Service - Pre Sales Support | Enterprise Architecture | | Enterprise Architect |
| Service - Marketing Support | | | |

Figure 7B

Competency-Role Alignment (CRA) table — 704

| | Level | Current | Target (+3Q) |
|---|---|---|---|
| Role | Enterprise | Enterprise Architect | Enterprise Architect |
| Skill - Primary | Focus Area | ADM - SOA - SOA | Enterprise Architecture - ~ - Enterprise |
| Skill - Secondary | Focus Area | BPM - ~ - BPM | BPM - ~ - BPM |
| Skill - To Learn | Sub-Focus Area | ADM - SaaS - SaaS | |
| Tag To - Community | Community-I | Enterprise Architecture - ~ - Enterprise | |
| | Community-II | ADM - SaaS - SaaS | |
| | Community-III | ADM - Legacy Modernization - Legacy | |

Figure 7C

ROLE-ALIGNED COMPETENCY AND LEARNING MANAGEMENT SYSTEM

CROSS REFERENCE TO RELATED APPLICATION

This application claims priority under 35 U.S.C. § 119 to Indian Application No. 3038/MUM/2011, filed on Oct. 27, 2011, the entirety of which is incorporated herein by reference.

TECHNICAL FIELD

The present subject matter described herein, in general, relates to systems and methods for managing competencies of employees in an organization.

BACKGROUND

Efficient utilization of employees in an organization is one of the most important keys for success of the organization. Significant challenges exist for those organizations that do not efficiently and effectively manage employee utilization and development. Presently, a lot of organizations with several thousand employees face the daunting task of managing competencies or skill set of the employees. For example, consider an Information Technology (IT) organization with thousands of employees across the globe with multi-disciplinary skill-set and cross-organizational distribution. With such a large employee base, it is imperative that the IT organization avails right competencies with right expertise-level at right time and at right location to fulfill organizational goals. To achieve this objective, the IT organization may resort to one or more measures, such as realigning the competencies possessed by the employees, relocating the employees with desired competencies to required locations, and cross-training the employees in order to achieve competencies that are needed for the fulfillment of the organizational goals. However, managing the training and deployment of such a large number of employees with multi-disciplinary skill-set and cross-organizational distribution is quite a daunting task.

Further, due to rapid changes that occur in the technology landscape and its applicability to address customer's needs, competencies of employees have to be regularly upgraded so that the employees can meet the ever-evolving customer expectations. For regular upgrade of competencies of several thousand employees, in accordance with organizational goals, there is a growing demand for Competency Management Tools.

In addition to meeting business requirements, Competency Management Tools can also help in career planning and employee retention. Specifically, in a fast changing competitive landscape, organizations are at the risk of losing core business capabilities and, subsequently, competitive advantage due to high employee attrition rates. Studies have shown that even employees reporting high satisfaction with workload, work environment and base salary are seven times more likely to consider changing employers when few opportunities for career growth exist. The American Society of Training and Development (ASTD) estimates that the cost to replace a professional is estimated to be 150% of the professionals annual salary, and the costs include the time required to find a replacement, recruiting fees, vacancy costs, productivity losses, and training.

SUMMARY

This summary is provided to introduce concepts related to systems and methods for managing competencies of employees in an organization and the concepts are further described below in the detailed description. This summary is not intended to identify essential features of the claimed subject matter nor is it intended for use in determining or limiting the scope of the claimed subject matter.

In one implementation, a system for managing and utilizing competencies of employees of an organization is provided. The system comprises a processor and a memory coupled to the processor. The memory comprises a Role Managing Module (RMM) configured to define a set of roles in a database. Each role of the set of roles indicates a functional job in the organization. The RMM is further configured to assign an expected maturity level in a set of knowledge dimensions to each role in the set of roles. The set of knowledge dimensions comprises at least one of a Solution Dimension, a Technology Dimension, a Process Dimension, and an Organization Dimension. The memory further comprises a planning module configured to create a career progression plan based on the set of roles.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 7A is a pictorial representation of an employee profile, in accordance with an embodiment of the present subject matter.

FIG. 7B is a pictorial representation of a career progression plan of an employee, in accordance with an embodiment of the present subject matter.

FIG. 7C is a pictorial representation of a competency-role alignment table, in accordance with an embodiment of the present subject matter.

DETAILED DESCRIPTION

Figure 1:
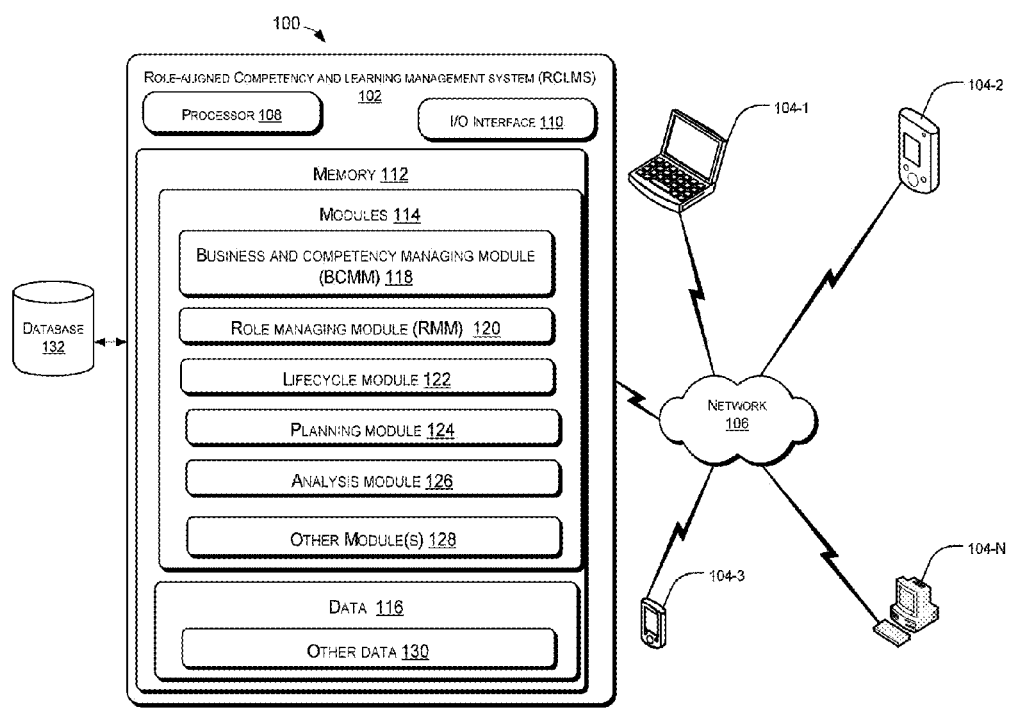
FIG. 1 illustrates a network implementation of a Role-aligned Competency and Learning Management System (RCLMS), in accordance with an embodiment of the present subject matter.

System and method for managing learning and competencies of employees of an organization are described herein. The system and the method can be implemented in a variety of computing systems. The computing systems that can implement the described method include, but are not restricted to, mainframe computers, workstations, personal computers, desktop computers, minicomputers, servers, multiprocessor systems, laptops, mobile computing devices, and the like.

The system and the method of the present subject matter relate to a Role-aligned Competency and Learning Management System (RCLMS) that provides for management of the competencies and learning of the employees in the organization. Examples of the organization may include an IT organization, a product manufacturing organization, a telecommunication organization, or other large conglomerates. The present subject matter may be explained mainly considering the organization to be an IT organization. However, it will be appreciated by a person skilled in the art that the organization may be any organization involved in any line of business.

In one implementation, the RCLMS may include several modules for creating and using a competency management framework. In one implementation, the competency management framework may be created over a database. The database may include a record of competencies or skill set of all the employees, a set of roles in the organization, profiles of the employees, and other information as will be explained below. For purposes of discussion only and not as limitation, the RCLMS may be described as operating in three phases, namely, a need phase, a plan phase, and an analyze phase. The need phase corresponds to creation of the competency management framework and the underlying database. The plan phase corresponds to modeling of a progressive approach to achieve desired competency by assessing current competencies and mapping between these two competencies to achieve progression. The analyze phase includes analyzing a gap in demand and supply of competencies for a manager to review and act upon. Thus, in operation, the RCLMS builds the framework in the need phase, and uses the framework in the plan and analyze phases to manage employee competency in the organization. In this process, the RCLMS also updates the database in the plan phase and analyze phase.

In one implementation, the RCLMS may build the framework in the need phase using three types of information, namely business information, process information, and measurement information. For purposes of discussion, the building of the framework in the need phase is described with respect to building the underlying database in three stages corresponding to the three types of information. In the business stage, the RCLMS may classify a business of the organization into a plurality of business areas in the database. In one example, considering the organization to be an IT organization, a business of the IT organization may be classified into the plurality of business areas, such as, service technology areas and product technology areas. Examples of the service technology areas may include Application Development and Maintenance (ADM), Enterprise Processes (ERP Solution), Business Intelligence (BI), Enterprise Content Management, and the like. Similarly, examples of the product technology areas may include software products developed by SAP, Oracle, IBM, Microsoft, and the like.

In one implementation, after the service technology areas and the product technologies areas are classified in the database for the organization, the RCLMS may categorize each service technology area and each product technology area into hierarchy levels. In the present implementation, a three-level hierarchical structure may be used with the levels being focus area, sub focus area, and community. The focus area identifies the service technology area or the product technology area. For example, in case the service technology area is Enterprise Processes, then the focus area would be Enterprise Processes, the sub focus area may be Human Resource (HR), and the community may be Compensation or Talent Management or Talent Acquisition or Appraisal.

It may be understood that the employees in the organization may possess competencies in one or more hierarchy levels of at least one of the service technology areas and product technology areas. Therefore, the hierarchy levels may be interchangeably referred to as 'competency areas' in the present subject matter. Categorizing the business areas into competency areas helps to drill down to an appropriate competency area when there is need to find an employee having a particular competency in a particular community of a particular business area. For example, by categorizing the Enterprise Processes into the competency areas of Enterprise Processes (focus area), Finance (sub focus area), and Indirect Tax (community), the RCLMS may easily find an employee having competency in the community called Indirect Tax. In other words, after the service technology areas and the product technology areas are classified into competency areas, the RCLMS will be able to find an employee with the right competency efficiently based upon the organization need.

After defining competency areas in each of the service technology areas and the product technology areas in the database, the RCLMS may define a competency register for each community in the service technology areas and the product technology areas. For example, the community called Talent Acquisition (in the sub focus area of HR and focus area of Enterprise Processes) may be associated with a competency register.

After defining competency areas for the services technology areas and the product technology areas, the RCLMS may associate each competency area with expected proficiency levels in the database. The expected proficiency levels are indicative of expertise levels of competency that the employees are expected to possess in one or more of the competency areas.

Further, the RCLMS may define a set of roles in the database based upon a user input. Each role in the set of roles is indicative of a functional job in the organization. The RCLMS may further assign an expected maturity level in a set of knowledge dimensions to each role in the set of roles. The set of knowledge dimensions may include at least one of a Solution Dimension (SD), a Technology Dimension (TD), a Process Dimension (PD), and an Organization Dimension (OD).

In a next stage of the need phase, i.e. the process stage, a Lifecycle Process is designed for the different competencies required in each of the plurality of business areas. The Lifecycle Process defines how each competency may be created, deployed, supported, and retired in the organization. In one implementation, for defining the Lifecycle Process, five stakeholders may be involved. The five stake holders may be Competency Owner, Human Resource, Training Manager, Delivery Management, and the Employee.

After defining the Lifecycle Process in the process stage, the RCLMS may define a set of metrics in the database for competency measurement in a next stage of the need phase, i.e. the measurement stage. The set of metrics may help to measure and track organization and employee level competency building, its alignment with organizational goals, and progression. The set of metrics may include, for example, a Cumulative Proficiency Index (CPI), a Role Competency Index (RCI), and a Best Fitment Index (BFI), as will be explained later with reference to the figures.

Thus, the RCLMS builds the competency management framework and the underlying database, in the need phase, based on the businesses and competency areas in which the organization functions; the processes that will be used to create, deploy and support various competencies through their lifecycle; and the metrics that will be used to assess and track competency management in the organization.

In the plan phase, the RCLMS may use the competency management framework for modeling of a progressive approach to achieve desired competency levels through direction setting for the organization and alignment of employee aspiration to organizational priority. For this, the RCLMS generates employee profiles based upon user input. The employee profiles may include employee name, employee ID, employee contact information, current competencies of the employee, desired competencies to be acquired in next N-cycle/quarters, and the like. Further, based on user input, the RCLMS may create a career progression plan to acquire required competencies, as will be discussed later.

In the analyze phase, the organization may use the RCLMS to analyze the demand and supply forecasts of right resource with right skill at the right time and in the right location for proper utilization of the employee competencies and proper allocation of the employees in the organization. Accordingly, the organization can use the RCLMS to create a roadmap for bridging the demand and supply gap. Additionally, employees may also use the RCLMS to plan their career progression in consultation with their supervisor or manager. Therefore, the system and the method may be used to build a competency management framework using a database that includes information related to employees, roles and competencies to manage and utilize competencies of the employees in the organization.

While aspects of described system and method for managing and utilizing competencies of the employees in the organization may be implemented in any number of different computing systems, environments, and/or configurations, the embodiments are described in the context of the following exemplary system.

Referring now to FIG. 1, a network implementation 100 of a Role-aligned Competency and Learning Management System (RCLMS) 102 for managing and utilizing competencies of employees in an organization is illustrated, in accordance with an embodiment of the present subject matter. Further, the RCLMS 102 may be implemented in a variety of computing systems, such as a laptop computer, a desktop computer, a notebook, a workstation, a mainframe computer, a server, a network server, and the like. It will be understood that the RCLMS 102 may be accessed by the employees of the organization through one or more client devices 104-1, 104-2, . . . 104-N, collectively referred to as client devices 104 hereinafter, or applications residing on client devices 104. Examples of the client devices 104 may include, but are not limited to, a portable computer, a personal digital assistant, a handheld device, and a workstation. The client devices 104 are communicatively coupled to the RCLMS 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the RCLMS 102 may include at least one processor 108, an I/O interface 110, and a memory 112. The at least one processor 108 may be implemented as one or more microprocessors, microcomputers, microcontrollers, digital signal processors, central processing units, state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the RCLMS 102 to interact with a user directly or through the client devices 104. Further, the I/O interface 110 may enable the RCLMS 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes. The memory 112 may include modules 114 and data 116.

The modules 114 include routines, programs, objects, components, data structures, etc., which perform particular tasks or implement particular abstract data types. In one implementation, the modules 114 may include a Business and Competency Managing Module (BCMM) 118, a Role Managing Module (RMM) 120, a lifecycle module 122, a planning module 124, an analysis module 126, and other modules 128. The other modules 128 may include programs or coded instructions that supplement applications and functions of the RCLMS 102.

The data 116, amongst other things, serves as a repository for storing data processed, received, and generated by one or more of the modules 114. The data 116 may also include other data 130. The other data 130 may include data generated as a result of the execution of one or more modules in the other module 128.

In one embodiment, the Role-aligned Competency and Learning Management System (RCLMS) 102 helps in managing competencies and learning of the employees in an organization. Examples of the organization may include an IT organization, a product manufacturing organization, a telecommunication organization, or other large conglomerates. The present subject matter may be explained mainly considering the organization to be an IT organization; however, it will be appreciated by a person skilled in the art that the organization may be any organization involved in any line of business.

As shown in FIG. 1, the RCLMS may include several modules for building and using a competency management framework. In the following description, the competency management framework has been discussed with reference to an underlying database 132 that is connected to the RCLMS, as shown in FIG. 1, and the various modules in the modules 114. Although in the present embodiment the database 132 is shown to be outside the RCLMS, in another embodiment, the database 132 may be a part of the RCLMS. In one implementation, the database 132 may include a record of competencies or skill set of all the employees, a set of roles in the organization, profiles of the employees, and other information as will be explained below. For purposes of discussion only and not as limitation, the RCLMS may be described as operating in three phases, namely, a need phase, a plan phase, and an analyze phase. In operation, the RCLMS builds the database 132 in the need phase and uses the database 132 in the plan and analyze phases to manage employee competency in the organization. In this process, the RCLMS also updates the database 132 in the plan phase and analyze phase based upon user input.

In one implementation, the RCLMS may build the database 132 in the need phase using three types of information, namely business information, process information, and measurement information. For purposes of discussion, the building of the database 132 in the need phase is described with respect to three stages corresponding to the three types of information.

In the business stage, the BCMM 118 may classify a business of the organization into a plurality of business areas in the database 132. In one example, considering the organization to be an IT organization, a business of the IT organization may be classified into the plurality of business areas, such as service technology areas and product technology areas. In other words, service technology areas and the product technology areas are indicative of an area of business of the IT organization. It may be understood that the IT organization may do business in several service technology areas and product technology areas. Examples of the service technology areas may include Application Development and Maintenance (ADM), Enterprise Processes (ERP Solution), Business Intelligence (BI), Enterprise Content Management, and the like. Similarly, examples of the product technology areas may include software products developed by SAP, Oracle, IBM, Microsoft, and the like.

Figure 2:
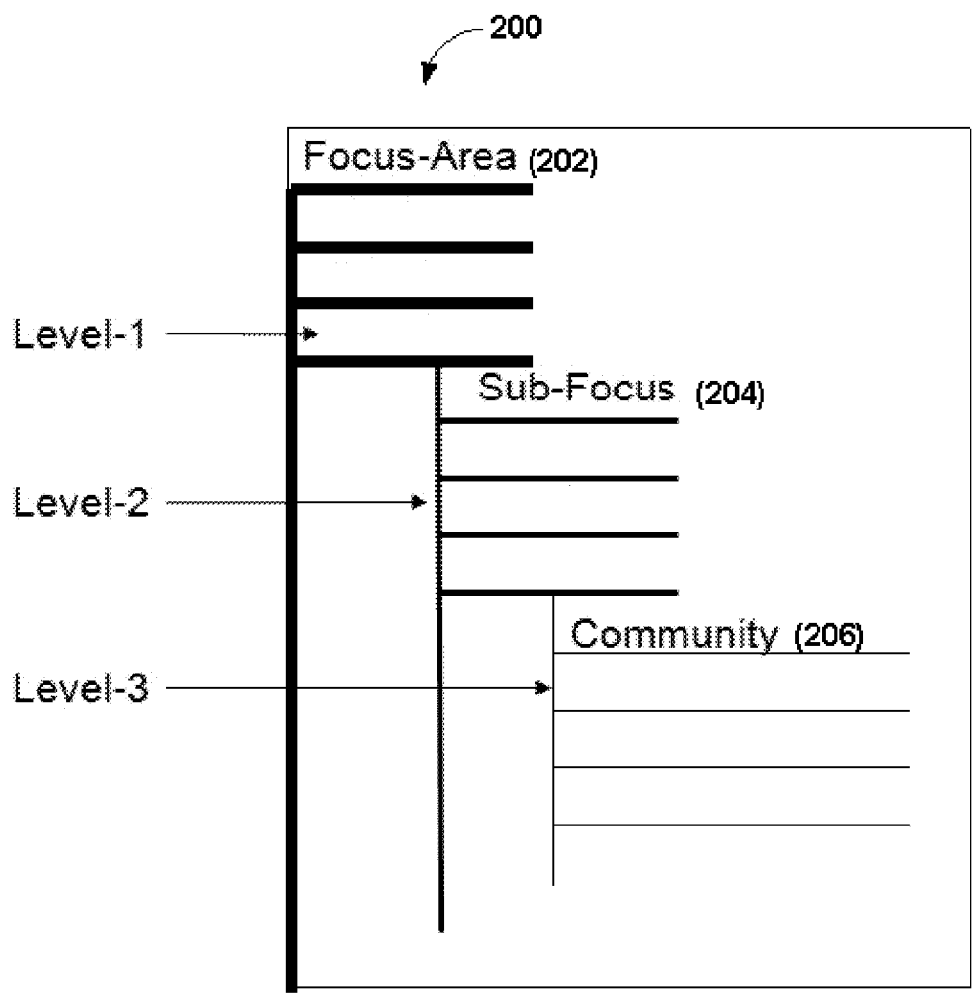
FIG. 2 is a pictorial representation of hierarchy levels in a business area of an organization, in accordance with an embodiment of the present subject matter.

In one implementation, after all the service technology areas and the product technologies areas are classified in the database 132 for the organization, the BCMM 118 may categorize each service technology area and each product technology area into hierarchy levels 200 as shown in FIG. 2. In the present implementation, a three-level hierarchical structure may be used to define the hierarchy levels. However, it will be understood that in other implementations, different number of hierarchy levels may be used.

As shown in FIG. 2, in one implementation, the hierarchy levels may be a focus area 202, a sub focus area 204, and a community 206. The focus area 202 identifies the service technology area or the product technology area. For example, in case the service technology area is Enterprise Processes, then the focus area 202 would be Enterprise Processes, the sub focus area 204 may be Human Resource (HR), and the community 206 may be Compensation or Talent Management or Talent Acquisition (TA) or Appraisal (as shown in example in FIG. 2). In another example, when the focus area 202 of a service technology area may be Enterprise Processes, the sub focus area 204 may be Finance, and the community 206 may be Indirect Tax or Income Tax or Corporate Finance. Similarly, in case the product technology area is Oracle, then the focus area 202 may be Oracle, the sub focus area 204 may be Siebel, and the community 206 may be Siebel Loyalty Management.

In the example mentioned above, where the sub focus area 204 is HR, Compensation, Talent Management, Talent Acquisition are peer communities under the common sub focus area 204 and therefore may be considered to be in the same peer class. Similarly, for a product technology area, Oracle product modules for a common sub focus area 204 HR may be considered to be in the same peer class. However, product modules for a common sub focus area 204, such as HR, but from different product technology areas may be considered to be conjugates to each other and therefore may belong to a conjugate class.

It may be understood that the employees in the organization may possess competencies in one or more hierarchy levels of at least one of the service technology areas and product technology areas. Therefore, the hierarchy levels may be interchangeably referred to as 'competency areas' in the present subject matter. Categorizing the business areas into competency areas helps to drill down to an appropriate competency area when there is need to find an employee having a particular competency in a particular community 206 of a particular business area. For example, by categorizing the Enterprise Processes into the competency areas of Enterprise Processes (focus area 202), Finance (sub focus area 204), and Indirect Tax (community 206), the RCLMS may easily find a competency in the community 206 called Indirect Tax. In other words, if the service technology areas and the product technology areas are classified into competency areas, the RCLMS will be able to find a right competency efficiently based upon the organization need.

In one embodiment, after defining competency areas in each of the service technology areas and the product technology areas in the database 132, the BCMM 118 may define a competency register for each community 206 in the service technology areas and the product technology areas. For example, the community 206 called Talent Acquisition (in the sub focus area 204 as HR and focus area 202 as Enterprise Processes) may be associated with a competency register. In this example, the competency register may include a method to generate a list of academic institutions in India, a rating of the institutions, a list of institutions which may allow the organization to be present on a first day of recruitment, a list of institutions which possess a good relationship with the organization, and the like. In this manner, each community 206 in each of the service technology areas and the product technology areas may be associated with a competency register in the database 132. The following example shows a service technology being divided into the competency areas with corresponding competency register comprising a list of competencies in a community. The list of competencies in the competency register of community Talent Acquisition (TA) may be referred to as TA1, TA2, TA3, . . . TAn:

Focus area 202→Sub focus area 204→Community 206→{Competency register}

Enterprise Processes→HR→Talent Acquisition (TA) →{TA1, TA2, TA3, . . . TAn}

In one implementation, the BCMM 118 may also associate each community 206 in each service technology area with one or more software products capable of catering to a community 206 in a service technology area. For example, the community 206 called Talent Acquisition in the sub focus area 204 as HR may be effectively and efficiently managed by a software product developed by SAP, or Oracle, or IBM. Therefore, the BCMM 118 may include a list of software products developed by various companies for each community 206 in each service technology area in the database 132. It may be understood that the list of software products may be appended with new software products as the same are introduced in market. For example, consider that the organization wishes to build consulting capabilities in Talent Acquisition (community 206) in HR (sub focus area 204) in Enterprise Processes (focus area 202). In this example, the organization may add one or more new products to the community Talent Acquisition. After the new products are added into the database 132, the organization may decide to build competency in the new products depending upon the organizational goals. In another implementation, the list of the software products may be modified to remove certain software products which become obsolete or which are not aligned to organizational goals.

Figure 3:
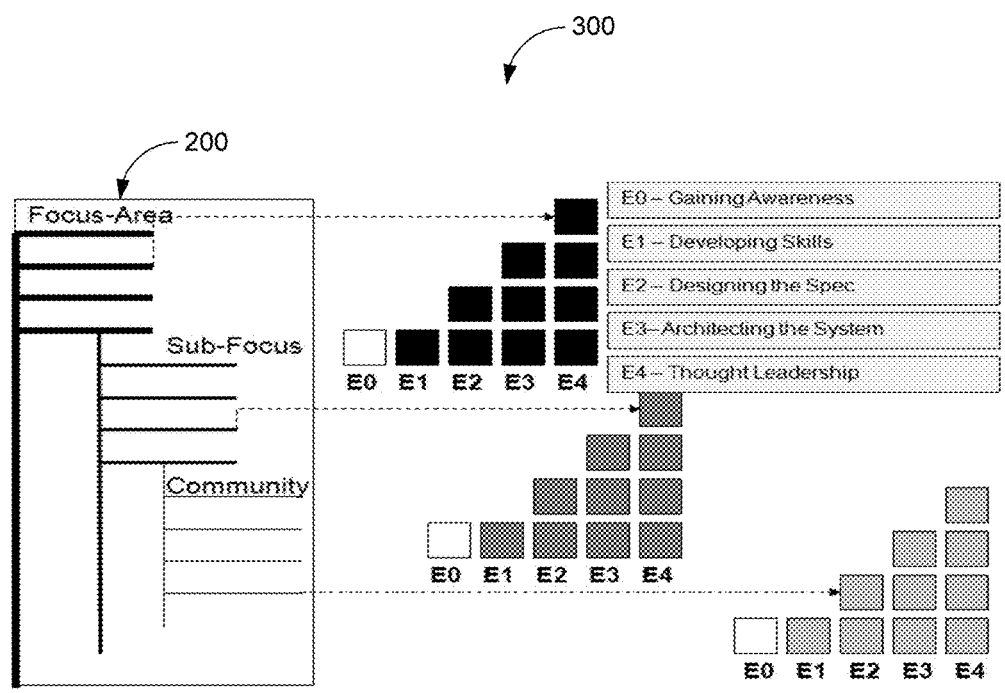
FIG. 3 is a pictorial representation of expected proficiency levels being associated with each of the hierarchy levels, in accordance with an embodiment of the present subject matter.

After defining competency areas for the services technology areas and the product technology areas, the BCMM 118 may associate each competency area with one or more of expected proficiency levels in the database 132. Specifically, FIG. 3 shows a pictorial representation 300 of expected proficiency levels being associated with each of the hierarchy levels, in accordance with an embodiment of the present subject matter. The expected proficiency levels are indicative of expertise levels of competency that the employees are expected to possess in one or more of the competency areas. In other words, the expected proficiency levels define a depth of expertise in a given competency area. In one implementation, there may be five expected proficiency levels, namely E0, E1, E2, E3, and E4, which may be defined as below:

E0→Exposed (Trained)

E1→Experienced (Basic Hands-On—Works under guidance)

E2→Expertise (Advanced Hands-On—Work without guidance)

E3→Enabler (Internal Recognition—Go-To Person in the organization)

E4→Evangelist (External Recognition—Thought Leadership—Innovative)

In another implementation, in case the organization is an IT organization, the expected proficiency levels may be defined as follows:

E0→Gaining Awareness (Ready to work under probation)

E1→Developing Skills (Skill required to work with minimal guidance)

E2→Designing the Specification (Ability to design the system)

E3→Architecting a System (Ability to architect a system)

E4→Thought Leader (Recognized as a thought leader and mentor the community 206)

The proficiency levels, as discussed above, are indicative of the depth of understanding of an employee in a particular competency area. For example, an employee having competency in the Enterprise Processes (focus area 202) is expected to be a thought leader and, therefore, the focus areas 202 are associated with highest expected proficiency levels. Similarly, an employee having competency in the HR (sub focus area 204) is expected to have competency in multiple communities under the sub focus area 204 HR. Therefore, the expected proficiency levels for the sub focus areas are higher than the expected proficiency levels at a community 206. For example, the expected proficiency level of E3 may be associated with competency area HR (sub focus area 204) because an employee in the competency area HR is expected to develop, design, and architect complete HR processes including multiple communities under HR. Similarly, an employee having competency in the Talent Acquisition community 206 is expected to have E0 to E2 level of proficiency. Therefore, in one example, the focus areas may be associated with the expected proficiency levels of E3 to E4, the sub focus areas may be associated with the expected proficiency levels of E2 to E3, and the communities may be associated with the expected proficiency levels of E0 to E2.

The BCMM 118, thus, in the business stage, classifies the business of the organization into various business areas and hierarchy levels, and assigns expected proficiency levels to the various hierarchy levels.

Generally, the employees in the various business areas of the organization, having competency in one or more of the hierarchical levels, are assigned various roles based on certain pre-requisites and expectations in both technology and non-technology areas. Hence, the RCLMS 102, in the business stage of the need phase, also defines a set of roles for employees to aspire and the expected proficiency levels for each of the roles.

Figure 4:
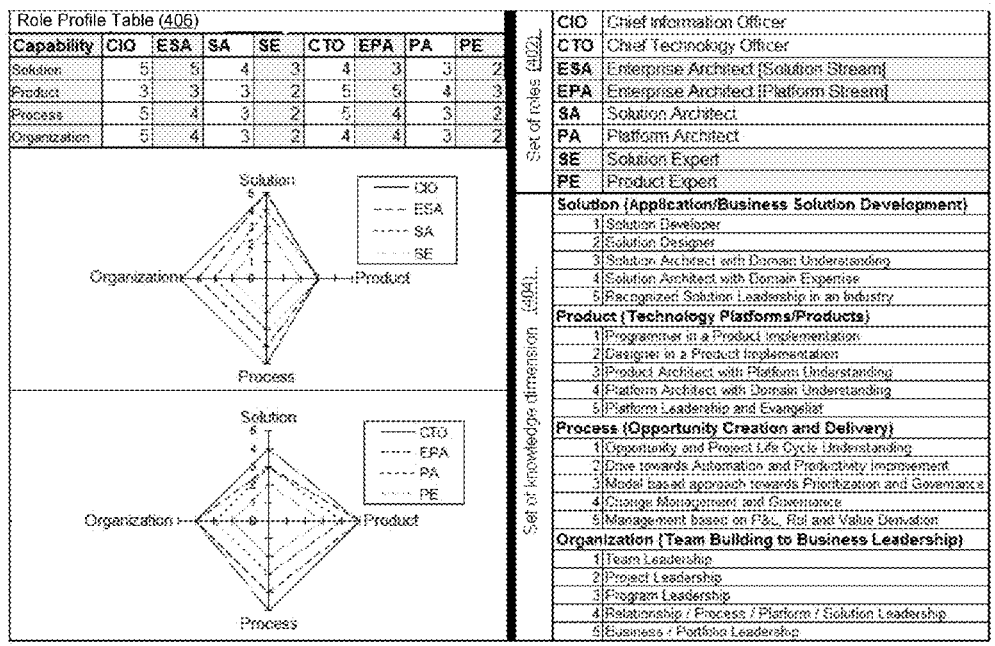
FIG. 4 is a pictorial representation of a set of roles defined in the organization, in accordance with an embodiment of the present subject matter.

Referring now to FIG. 4, a pictorial representation of a set of roles 402 defined in the organization is shown, in accordance with an embodiment of the present subject matter. Each role in the set of roles 402 is indicative of a functional job in the organization. Further, each role of the set of roles 402 is associated with at least one of the plurality of business areas defined above. In one implementation, the Role Managing Module (RMM) 120 of the RCLMS 102 may define the set of roles 402 in the database 132 based upon a user input. Further, the set of roles 402 may be broadly classified into eight meta roles for the service technology areas and the product technology areas. The set of roles 402 may include Product Expert (PE), Solution Expert (SE), Platform Architect (PA), Solution Architect (SA), Enterprise Architect for platform stream (EPA), Enterprise Architect for solution stream (ESA), Chief Technology Officer (CTO), and Chief Information Officer (CIO). The functional jobs are derived from the set of roles for specified service technology area or product technology area or both.

After defining the set of roles 402, the RMM 120 may assign each role in the set of roles 402 to an expected maturity level in a set of knowledge dimensions 404. The set of knowledge dimensions 404 may include at least one of a Solution Dimension (SD), a Technology Dimension (TD), a Process Dimension (PD), and an Organization Dimension (OD). The expected maturity levels are indicative of expertise level that the employees are expected to possess in each of the set of knowledge dimensions 404 to perform a role of the set of roles 402 defined above. For example, the employees in the organization should not only have skills in business areas, but should also have skills in non-technology areas such as communication skills, client handling capabilities, leadership skills, innovative skills, and the like. Therefore, the set of knowledge dimensions 404 help in measuring the maturity level that an employee should have in the business areas and the non-technology areas.

In one implementation, the Solution Dimension relates to service technology areas. The Solution Dimension may include five expected maturity levels, such as, a first level being a solution developer, a second level being a solution designer, a third level being a solution architect with domain understanding, a fourth level being a solution architect with domain expertise, and a fifth level being a recognized solution leadership in an industry. The recognized solution leadership in an industry is the one who has either written a book on certain topic, or been invited to major conferences as a guest speaker, or has patents on their names, or writes a technology column in a newspaper/magazine, and the like.

Similarly, the Technology Dimension relates to product technology areas. The Technology Dimension may also include five expected maturity levels, such as a programmer in a product implementation, a designer in a product implementation, a product architect with platform understanding, a platform architect with domain understanding, and a platform leadership and evangelist.

Similarly, the Process Dimension relates to knowledge of software development processes, sales and marketing processes, patent filing processes, or any process that is relevant in an IT organization. The Process Dimension may include five expected maturity levels, such as an opportunity and project lifecycle understanding, a drive towards automation and productivity improvement, a model based approach towards prioritization and governance, change management and governance, management based on Profit & Loss/Return on Investment/value derivation.

The Organization Dimension relates to communication skills, team handling and team building capabilities, client communication, client relationships, leadership, and the like. The Organization Dimension may include five expected maturity levels, such as a team leadership, a project leadership, a program leadership, a relationship/process/platform/solution leadership, and business/portfolio leadership.

In one example, the Product Expert is expected to have a maturity level of 2/5 in the Solution Dimension, 3/5 in the Technology Dimension, 2/5 in the Process Dimension, and 2/5 in the Organization Dimension. Similarly, each of the above mentioned roles may be expected to possess a certain maturity level in each of the set of knowledge dimensions 404 as shown in Role Profile Table 406 in FIG. 4. Therefore, by defining expected maturity levels in each of the set of knowledge dimensions 404, the RCLMS 102 provides an overview of proficiencies required for meeting a role's requirements and the proficiencies to be developed for moving on to a higher or different role.

To summarize the business stage of the need phase, it may be understood that at first, the BCMM 118 may classify the business into plurality of business areas. Then, the BCMM 118 may define competency areas for each of the plurality of business areas. After the competency areas are defined, the BCMM 118 may assign an expected proficiency level to each competency area. Subsequently, the RMM 120 may define a set of roles 402 in the organization. Each role in the set of roles 402 is expected to possess a maturity level in each of the set of knowledge dimensions 404.

For the various competencies identified and classified with respect to the different hierarchy levels and roles in the organization, lifecycle processes may be created to define how each competency may be created, deployed, supported and retired, and the various stakeholders who will be involved in this process. This is done by the RCLMS 102 in the next stage of the need phase, i.e., the process stage.

Figure 5:
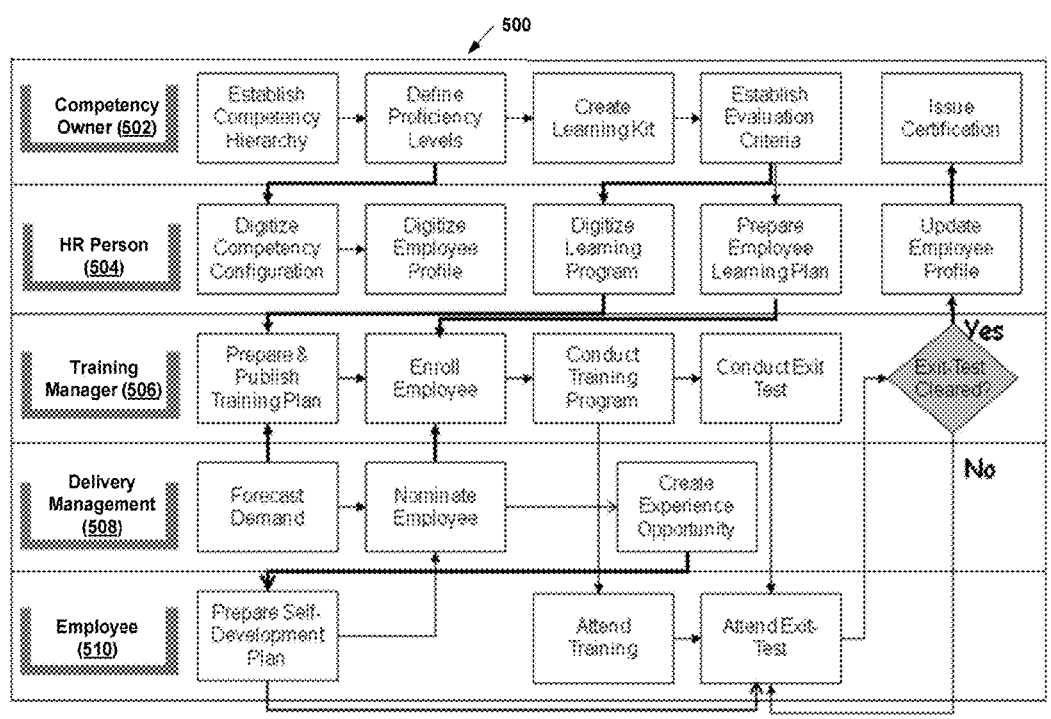
FIG. 5 is a flow diagram illustrating a Lifecycle Process, in accordance with an embodiment of the present subject matter.

Referring now to FIG. 5, a flow diagram illustrating a Lifecycle process 500 is shown, in accordance with an embodiment of the present subject matter. Specifically, the lifecycle module 122 of the RCLMS 102 designs the Lifecycle process 500. As mentioned, the Lifecycle process 500 is a part of a next stage of the need phase, i.e. the process stage. The Lifecycle process 500 is designed for each competency in each competency area of the plurality of business areas. The Lifecycle process 500 gives step by step detail of entire competency lifecycle, according to one implementation. Furthermore, the Lifecycle process 500 defines a method to retain current competencies and achieve desired competencies. In one example, the Lifecycle process 500 includes defining objectives that the employees should achieve in order to retain current competencies or attain desired competencies. The objectives may include training programs, a number of years of experience, and the like.

In one implementation, the Lifecycle process 500 may define a process of how a competency will originate and when will the competency retire. Consider an example in order to understand the Lifecycle process 500 of a competency. In this example, an employee X in the organization may have been a top notch HR consultant 3 years back, but today the employee X does not work in HR. If the competency of the employee X as an HR consultant does not get retired or deleted from the database 132, the organization may remain under a false impression that the organization has competency in HR in the form of the employee X. Therefore, by defining a life cycle for a competency, from origination to retirement, the database 132 is kept updated regarding the employee competencies. A competency may retire from the database 132 either from an employee's perspective or from an organization's perspective. From the employee's perspective, a competency may retire when there is no further learning by employee to retain the competency. On the other hand, from the organization's perspective, a competency may retire from the database 132 when the organization no more wishes to focus on the competency. For example, all competencies related to ADA programming language may retire if the organization decides not to focus on the ADA programming language.

In one implementation, the Lifecycle process 500 may have five stakeholders to ensure it creation, support and retirement. The five stake holders may include a Competency Owner 502, HR person 504, Training Manager 506, Delivery Management 508, and an Employee 510, as shown in FIG. 5. In order to understand the Lifecycle process 500 involving the five stakeholders, the following example may be considered. In this example, the organization wishes to grow its Customer Relationship Management (CRM) business. To grow the CRM business, the organization may need to know various details, such as the number of employees currently working in CRM, current set of opportunities in CRM, number of employees in Oracle solution or SAP solution working on CRM, number of products available in the market for CRM, upcoming products, expected growth rate of the organization in CRM, current revenue generated in CRM, a projected target in terms of revenue, number of employees needed in the near future, a projected time duration, amount of CRM work expected in the near future, and the like. Having obtained these details, the organization may employ the Competency owner 502 to put in place a strategy for developing the identified competency in the employees to achieving organizational goals. Specifically, the Competency owner 502 may establish a competency hierarchy, define proficiency levels, create learning kit, and establish evaluation criteria for the employees needed in the CRM business to fulfill the organizational goals.

The HR person 504 may ensure that the employees are available and incentivized to gain the competency. The HR person 504 may further determine the number of employees currently working in CRM, the number of employees needed to achieve the projected target in terms of revenue, current competency proficiency of the employees working in CRM, and the like. Simultaneously, the Training manager 506 may prepare training plans for the employees shortlisted by the HR to work on CRM. Specifically, the Training manager 506 may prepare and publish training plans, enroll the employees for training, conduct training program, and conduct exit tests for the employees. The Delivery management 508 forecasts demands, nominates employees and gives a list of nominated employees to the HR person 504. The Employee 510 prepares a self development plan, attends trainings, and takes tests in order to achieve desired competency.

Once the processes for creating, supporting and retiring competencies have been defined, various metrics are also defined to measure the effectiveness of the competency framework. This is done by the RCLMS 102 in the third stage of the need phase, i.e., the measurement stage. In one implementation, at least three metrics, corresponding to cumulative proficiency index, role competency index and best fitment index, are defined by the BCMM 118 of the RCLMS 102.

Figure 6:
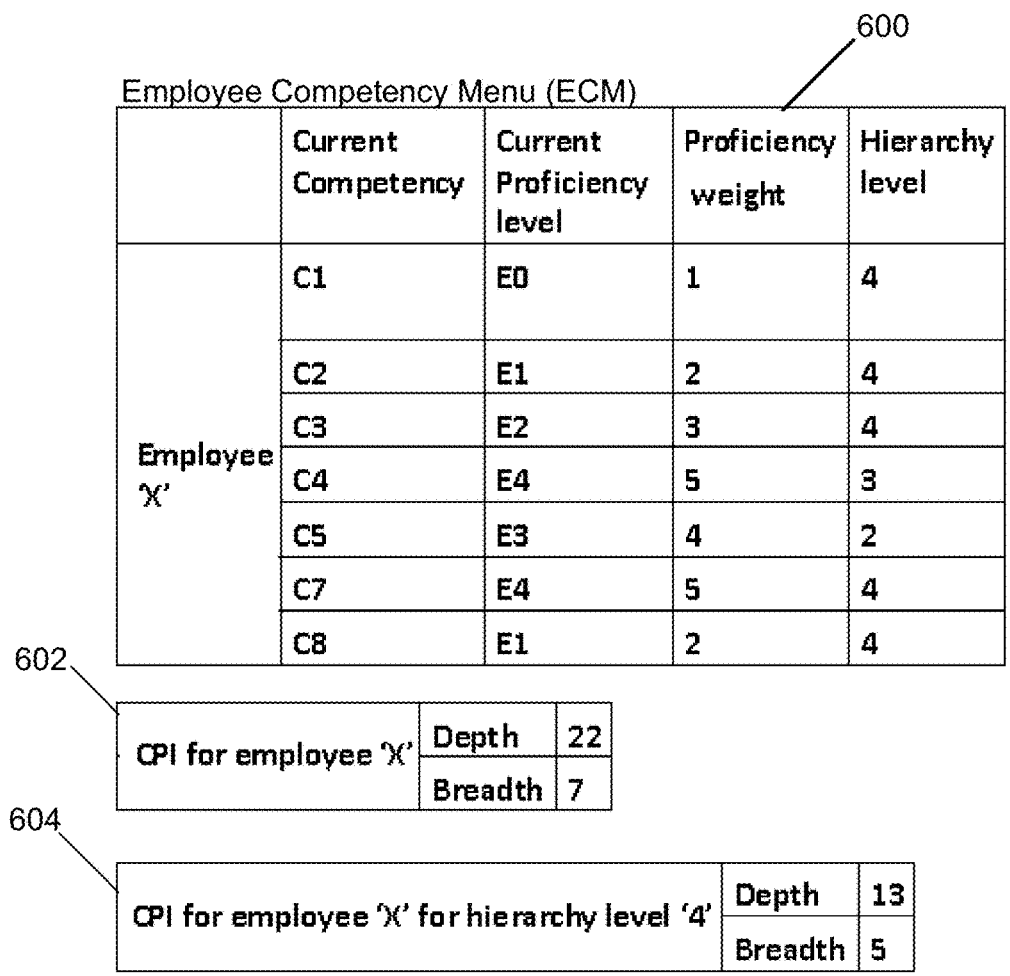
FIG. 6 is a pictorial representation of an Employee Competency Menu (ECM), in accordance with an embodiment of the present subject matter.

Referring now to FIG. 6, a pictorial representation of an Employee Competency Menu (ECM) 600 is shown, in accordance with an embodiment of the present subject matter. The ECM 600 may be generated by the BCMM 118 in the measurement stage of the need phase. The ECM 600 may include a set of current competencies possessed by an employee in at least one of the hierarchy levels of at least one of the plurality of business areas. The ECM 600 may further include a current proficiency level associated with each of the set of current competencies possessed by the employee, a proficiency weight associated with each of the set of current competencies, and a hierarchy level associated with each of the set of current competencies. The ECM 600, as shown in FIG. 6, is an example of ECM 600 for an employee X. In the example shown in FIG. 6, the ECM 600 includes seven current competencies, namely, C1, C2, C3, C4, C5, C7, and C8. The current proficiency level defines a proficiency level for each of the seven competencies. Each proficiency level is associated with a fixed proficiency weight. For example, the proficiency level E0 has proficiency weight 1, the proficiency level E1 has proficiency weight 2, the proficiency level E2 has proficiency weight 3, and the like. Further, the hierarchy level '1' represents focus area 202, the hierarchy level '2' represents sub focus area 204, the hierarchy level '3' represents community 206, and the hierarchy level '4' represents competency register. In the ECM 600 shown in FIG. 6, each competency has an associated proficiency level, a proficiency weight, and a hierarchy level in which the Employee X has competency.

In one implementation, the BCMM 118 may calculate a Cumulative Proficiency Index (CPI) for the employee X using the ECM 600 as shown in table 602. The CPI may be calculated for each employee in the organization. The CPI may provide an indication of a competency proficiency progression required across various business areas. Further, the CPI is indicative of a depth and a breadth of the set of current competencies possessed by the employee X. The depth of the set of current competencies is equal to a summation of the proficiency weight associated with each of the set of current competencies i.e. 22 (as shown in FIG. 6), and the breadth of the set of current competencies is equal to a total number of competencies in the set of current competencies, i.e., 7 (as shown in FIG. 6).

In the present implementation, the BCMM 118 may also calculate a Cumulative Proficiency Index (CPI) for each hierarchy level for the employee X as shown in table 604. For example, the CPI for hierarchy level '4' may include a depth and a breadth of current competencies in the hierarchy level '4'. In the present example, the depth of the current competencies in the hierarchy level '4' is equal to a summation of the proficiency weight associated with the current competencies in the hierarchy level '4' i.e. 13, and the breadth of the current competencies is equal to a total number of competencies in the hierarchy level '4' i.e. 5. Similarly, CPIs may be calculated for hierarchy levels 3, 2, and 1.

The BCMM 118 may calculate a Role Competency Index (RCI) for each of the set of roles 402 defined in the business stage of the need phase. For example, if the organization needs a role of Designer in SAP in Finance domain, RCI may be calculated so that it may be determined what all competencies an employee should have and what should be an expected proficiency level of the competencies in order to fulfill the role of the Designer in SAP in Finance domain.

In one implementation, the RCI for a given role is determined based on weights and maturity levels to be acquired in each of the set of knowledge dimensions by an employee to perform the given role. As mentioned above, each of the set of roles 402 requires maturity across each of the set of knowledge dimensions 404 including the Solution Dimension (SD), the Technology Dimension (TD), the Process Dimension (PD), and the Organization Dimension (OD). The RCI for each of the set of roles 402 may be calculated using a following formula:

$$RCI = \Sigma_M W*L(SD,TD,PD,OD) + \Sigma_A W*L(SD,TD,PD,OD),$$

where M represents a mandatory set of knowledge dimensions for the role, A represents an additional set of knowledge dimensions for the role, W is a weight attached to the expected maturity levels in percentage, and L is the expected maturity level in each of the set of knowledge dimensions.

In one implementation, the BCMM 118 may calculate an employee's best fitment to a role in the set of roles 402 and publish an associated Best Fitment Index (BFI) for the employee. The BFI may be used to determine progressive improvement of an employee towards a desired role. Specifically, a matching process that generates a BFI of any employee for a role in the set of roles 402 is defined. In the matching process, both exact-match and fuzzy match is used to best-fit an employee for a given role. In the exact-match, employee's competencies must match to competencies needed for a given role. In the fuzzy match, employee's competencies may be equivalent to the competencies needed for the given role. This equivalence is determined by having a look-up of both peer class and conjugate class associated with that competency.

In one implementation, if an employee 'X' is recommended to fulfill a required role, such as a Designer in SAP in Finance domain, then the BCMM 118 may check current competencies of the employee 'X' from the database 132 and will generate a BFI for the employee 'X' with respect to required role. In this example, the employee 'X' may have the BFI of 70%, i.e., the current competencies of the employee 'X' has 70% matching with the required role. If 70% matching suits to the organization, the employee 'X' may be asked to perform the role of the Designer in SAP in Finance domain. Otherwise, a search query may be used to find other potential employees to fulfill the required role. The search query may include three parameters, such as a minimum percentage of matching required considering the current competencies and the required role, location of the employees, and time of availability of the employees. In the present example, if the organization requires a Designer in SAP in Finance Domain, the organization may put the search query with all three parameters into the RCLMS to find employees matching the required role.

Thus, the RCLMS 102 may build the competency framework and the underlying database 132 in the need phase using the BCMM 118, the RMM 120 and the lifecycle module 122. This competency framework can be used by the RCLMS 102 for planning and analysis to help the organization implement effective competency management. The competency framework can also be used by each employee for career planning in consultation with their manager. This is explained further with reference to the plan and analysis phases.

Referring now to FIG. 7A, a pictorial representation of an employee profile 700 is shown, in accordance with an embodiment of the present subject matter. The employee profile 700 shown in FIG. 7A is explained by the way of an example. In one implementation, the employee profile 700 may be generated by the planning module 124 in the plan phase. Specifically, the planning module 124 may generate an employee profile 700 for all the employees in the organization by fetching employee information previously stored the database 132. The employee profile 700 may include employee details, such as name, ID, contact information, designation, department, email ID, location, last reviewer/supervisor, new/current reviewer, and details about the current competencies of the employee, current proficiency level of the current competency, desired proficiency level in of the current competencies to be acquired in next N-cycles, desired competencies to be acquired in next N-cycles, and the like. Some of these details may be fetched from the database 132, while others may be input by the employee or the supervisor. In one example, one cycle is equal to a quarter comprising three months. The employee profile 700 may be validated by an employee supervisor for alignment of desired competencies with organizational goals/demands.

Referring now to FIG. 7B, a pictorial representation of a career progression plan 702 of an employee is shown, in accordance with an embodiment of the present subject matter. Specifically, based upon the employee's profile 700, the career progression plan 702 is created to acquire the desired proficiency level. In one implementation, the career progression plan 702 is created by the planning module 124. The career progression plan 702 shown in FIG. 7B is explained by the way of an example. The career progression plan 702 may include training courses, project experience, and technical service required to attain the desired proficiency levels and desired competencies mentioned in the employee profile 700. In one implementation, the career progression plan 702 may be created based on the set of roles 402 defined above. Specifically, the career progression plan 702 may define a current role of the employee and a future role that the employee may perform after attaining the desired proficiency levels and desired competencies. The future role may be selected from the roles defined in the set of roles 402.

After following the career progression plan 702, the employee may acquire certain competencies in N-cycles. Such competencies may be referred to as acquired competencies.

Referring now to FIG. 7C, a pictorial representation of a Competency-Role Alignment (CRA) table 704 is shown, in accordance with an embodiment of the present subject matter. In one implementation, the CRA table 704 is created by the planning module 124. The CRA table 704 shows a mapping of the acquired competencies to one or more roles defined in the set of roles 402. Specifically, the CRA table 704 shows that if the employee acquires the desired competencies and desired proficiency levels mentioned in the employee profile 700, then the employee may be assigned a new role.

At the organizational level, the database 132 with the competency management framework mentioned above, may be used by the organization to align the employee competencies as per the organizational objectives and future demand forecast. For this, the analysis module 126 of the RCLMS 102 may analyze the demand and supply of competencies of the employees for proper utilization and allocation of the employees in the organization. Specifically, in the analyze phase, the Delivery management 508 may forecast demand and supply of employees in a given time period with periodic milestones. For example, the Delivery management 508 may forecast a demand of 50 employees in 2 years to work in HR as the sub focus area 204 using Oracle product for several roles. All these 50 employees may not be required at one time but the requirement may be spread over a given time period. In one implementation, the Delivery management 508 may forecast that the organization may need 10 employees every quarter till five quarters, thereby fulfilling the demand.

Based on the demand of employees in the organization, a role list {R (S, P)} is obtained from the Delivery management 508, where $R_k$ ($S_i$, $P_j$), represents the role at k-th hierarchy with associated service competency $S_i$ and product competency $P_j$. The role list signifies competencies demanded in the organization. The service competency $S_i$ is representative of a competency in a service technology area, whereas the product competency $P_j$ is representative of a competency in a product technology area. In one example, a role list {R (S, P)} may be Designer (Supply Chain Logistics, SAP APO)). Here the role $R_k$ is Designer, service competency $S_i$ is Supply Chain Logistics and product competency $P_j$ is SAP APO.

In one implementation, the role list may also be associated with a location and a time at which the role is required. For example, a) Designer (Supply Chain Logistics, SAP APO) at Location L1 and Time T1, b) Developer (Business Intelligence, Cognos) at Location L3 and Time T1, c) Architect (Database, Oracle) at Location L7 and Time T2, and the like. After obtaining the location-time for each role in the role list, the analysis module 126 may calculate Best Fitment Index (BFI) for all employees with respect to the roles in the role list. The BFI may be calculated using the search query and the role list, as explained above. For example, to find the employees in the database 132 with competency in Designer (Supply Chain Logistics, SAP APO) at Mumbai and January 2012, a search query may be fed in the RCLMS 102. In one implementation, the search query may include the following parameters, such as a) a minimum percentage fit, b) location, c) time, d) role, e) competency area in service technology area, f) competency area in product technology area, and the like.

Based on the search query, in one implementation, a BFI may be calculated for each employee by the analysis module 126. As a result of calculation of BFI, the analysis module 126 may generate a set of priority lists. The set of priority lists may be used to address the demand and the supply of competencies of the employees in the organization. In one implementation, five priority lists may be generated, namely, a priority list P1, a priority list P2, a priority list P3, and a priority list P4, and a priority list P5. The priority list P1 may comprise names and Ids of employees with matched profiles in the same location and with availability status in the same time period. The priority list P2 may comprise names and Ids of employees with matched profiles as per 'competency to be acquired plan' in the same location and with readiness for availability status in the same time period. The priority list P3 may comprise names and Ids of employees with matched profiles in the same location and with availability status in a time period that is either one interval before or one interval after. The priority list P4 may comprise names and Ids of employees with matched profiles in other locations and with availability status in the same time period. The priority list P5 may comprise names and Ids of employees with equivalent profiles in the same location and with availability status in the same time period. Equivalent profiles are determined using fuzzy matching. In fuzzy matching, if the requirement is for a Designer in HR in SAP, then in the fuzzy matching, the peer class and the conjugate class of HR and the peer class and the conjugate class of SAP are searched to find equivalent profiles. In other implementations, a different number of priority lists may be generated based on how the organization may want to utilize its employees and their competencies.

In one implementation, based on the priority lists, the supervisors/managers may be required to modify the desired competencies in the employee profile of the employees reporting into them in order to align the desired competencies with organizational demands. Further, the supervisor may take the BFI of the employees in the priority lists into consideration for deciding whether to deploy an employee for the demanded role or not.

Therefore, the RCLMS 102 may be used to build and implement the competency management framework through the database 132 in order to manage and utilize competencies of the employees in the organization.

Figure 8:
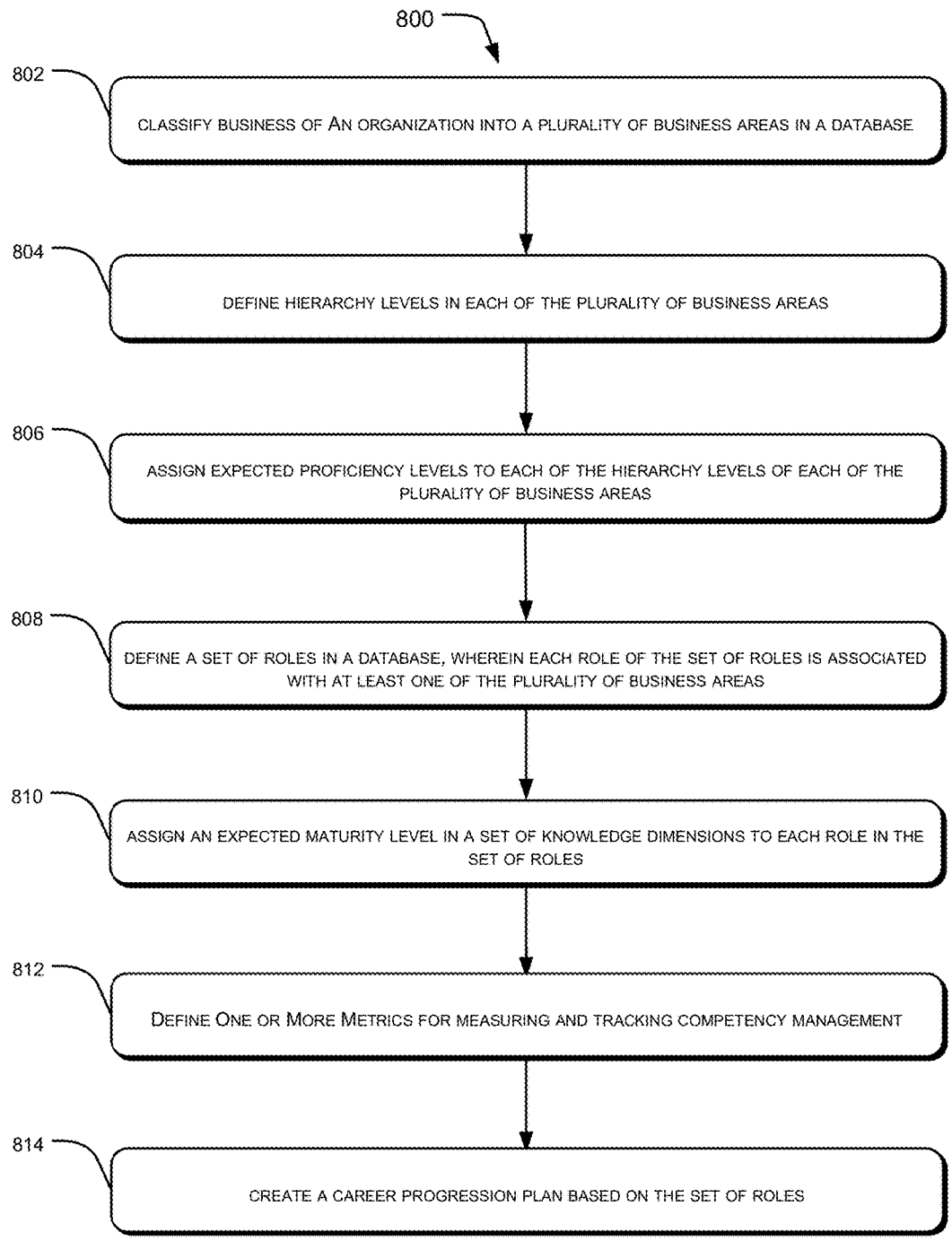
FIG. 8 shows a flowchart illustrating a method for managing and utilizing competencies of employees of an organization, in accordance with an embodiment of the present subject matter.

Referring now to FIG. 8, a method 800 for creating a competency framework for managing and utilizing competencies of employees of an organization is shown, in accordance with an embodiment of the present subject matter. The method 800 may be described in the general context of computer executable instructions. Generally, computer executable instructions can include routines, programs, objects, components, data structures, procedures, modules, functions, etc., that perform particular functions or implement particular abstract data types. The method 800 may also be practiced in a distributed computing environment where functions are performed by remote processing devices that are linked through a communications network. In a distributed computing environment, computer executable instructions may be located in both local and remote computer storage media, including memory storage devices.

The order in which the method 800 is described is not intended to be construed as a limitation, and any number of the described method blocks can be combined in any order to implement the method 800 or alternate methods. Additionally, individual blocks may be deleted from the method 800 without departing from the spirit and scope of the subject matter described herein. Furthermore, the method can be implemented in any suitable hardware, software, firmware, or combination thereof. However, for ease of explanation, in the embodiments described below, the method 800 may be considered to be implemented in the above described RCLMS 102.

At block 802, business of the organization is classified into a plurality of business areas. For example, the business of the organization is classified by the BCMM 118.

At block 804, hierarchy levels are defined for each of the plurality of business areas. The hierarchy levels being a focus area 202, a sub focus area 204, and a community 206. It may be understood that the employees in the organization may possess competency in at least one of the hierarchy levels of at least one of the plurality of business areas. In one example, hierarchy levels are defined by the BCMM 118.

At block 806, expected proficiency levels are assigned to each of the hierarchy levels of each of the plurality of business areas. The expected proficiency levels are indicative of expertise in a competency expected from the employees in each of the hierarchy levels. In one example, the expected proficiency levels are assigned by the BCMM 118.

At block 808, a set of roles 402 is defined in a database 132. Each role of the set of roles 402 indicates a functional job in the organization. Further, each role of the set of roles 402 is associated with at least one of the plurality of business areas. In one example, the set of roles 402 is defined by the Role Managing Module (RMM) 120.

At block 810, an expected maturity level in a set of knowledge dimensions 404 is assigned to each role in the set of roles 402. The set of knowledge dimensions 404 comprises at least one of a Solution Dimension (SD), a Technology Dimension (TD), a Process Dimension (PD), and an Organization Dimension (OD). In one example, the expected maturity level is assigned by the RMM 120.

At block 812, one or more metrics are defined to measure and track competency management, which includes both organization and employee level competency building, alignment with organizational goals and progression. In one example, the BCMM 118 may define 3 metrics, corresponding to cumulative proficiency index, role competency index and best fitment index At block 814, a career progression plan 702 is created based upon the set of roles 402. The career progression plan 702 may include training courses, project experience, and technical service required to attain the desired proficiency levels and desired competencies mentioned in the employee profile 700. In one example, the career progression plan 702 may be created by the planning module 124.

Although implementations for methods and systems for managing learning and competencies of employees of an organization have been described in language specific to structural features and/or methods, it is to be understood that the appended claims are not necessarily limited to the specific features or methods described. Rather, the specific features and methods are disclosed as examples of implementations for managing and utilizing competencies of employees in an organization.

We claim:

1. A Role-aligned Competency and Learning Management System (RCLMS) for generating a set of priority lists of employees of an organization for addressing demand and supply of competencies of the employees for at least one role in the organization, the RCLMS comprising:
 a processor; and
 a memory coupled to the processor, the memory comprising:
 a Business and Competency Managing Module (BCMM), stored in the memory and executable by the processor, to
 classify a business of the organization into service technology areas and product technology areas in a database, wherein the classifying includes categorizing of the service technology areas and product technology areas into a plurality of hierarchy levels; and
 determine at least a focus area, a sub-focus area and a community as hierarchy levels for each of the service technology areas and for each of the product technology areas, wherein the employees possess competency relating to at least one of the hierarchy levels of at least one of the service technology areas and the product technology areas, wherein the determination is based on a plurality of weights and maturity levels to be acquired in each of a set of knowledge dimensions;

a Role Managing Module (RMM), stored in the memory and executable by the processor, to
determine a set of roles in the organization, each role of the set of roles being indicative of a functional job of the employees of the organization and is associated with at least one of the service technology areas and the product technology areas; and an analysis module, stored in the memory and executable by the processor, to
obtain a role list comprising:
at least one role from the set of roles for which demand and supply of competencies of the employees is to be analyzed; and
at least one service competency and at least one product competency demanded for the at least one role;
obtain a location and a time at which the at least one role in the role list is required;
compute a Best Fitment Index (BFI) for each of the employees for the at least one role in the role list, based on:
exact matching of competencies possessed by a respective employee with the at least one service competency and the at least one product competency demanded for the at least one role;
fuzzy matching of competencies possessed by the respective employee and the at least one service competency and the at least one product competency demanded for the at least one role in at least one of a peer class of competencies and a conjugate class of competencies under the hierarchy levels, wherein an equivalence is determined by performing a check of at least one of peer class and conjugate class associated with at least one service competency and the at least one product competency; and
the location and the time for the at least one role;
identify employees for whom the BFI is greater than a predefined minimum percentage fit;
generate the set for priority lists of the identified employees based on the BFI, availability at the location, and availability at the time, for addressing the demand and the supply of competencies of the employees for the at least one role in the role list;
build a competency management framework by generating employee profiles based upon one or more user inputs to bridge a demand and supply gap; and
a lifecycle module, stored in the memory and executable by the processor, to implement a lifecycle process for each competency in each of the hierarchy levels of each of the service technology areas and the product technology areas, wherein the lifecycle process defines how the each competency is created, deployed, supported, and retired in the organization,
wherein the BCMM is further configured to calculate an Employee Competency Menu (ECM) for each employee, wherein the ECM comprises:
a set of current competencies possessed by the each employee in at least one of the hierarchy levels of at least one of the service technology areas and the product technology areas,
a current proficiency level associated with each of the set of current competencies possessed by the employee, and
a proficiency weight associated with the each competency of the set of current competencies, and
wherein the BCMM is further configured to calculate a Cumulative Proficiency Index (CPI) for the employee based on the ECM, wherein the CPI is indicative of a depth and a breadth of the set of current competencies possessed by the employee, wherein the depth is equal to a summation of the proficiency weight associated with each of the set of current competencies, and wherein the breadth is equal to a total number of competencies in the set of current competencies.

2. The RCLMS of claim 1, wherein:
the RMM is further configured to assign an expected maturity level in a set of knowledge dimensions for each role in the set of roles, the set of knowledge dimensions comprising at least one of a Solution Dimension, a Technology Dimension, a Process Dimension, and an Organization Dimension, and the expected maturity level being indicative of an expertise level of competency expected from an employee; and
the BCMM is further configured to calculate a Role Competency Index (RCI) for each role in the set of roles, wherein the RCI is indicative of competencies and proficiency levels expected from the employees for the each role, and wherein the RCI is calculated based on a mandatory set of knowledge dimensions for the role, a weight attached to the expected maturity levels in percentage, and the expected maturity level in each of the set of knowledge dimensions for the role.

3. The RCLMS of claim 1, wherein the set of priority lists comprises at least one of:
a priority list comprising names and identities of employees with matched competencies, and with availability at the location and at the time;
a priority list comprising names and identities of employees with matched competencies as per a career progression plan, and with availability at the location and at the time;
a priority list comprising names and identities of employees with matched competencies, and with availability at the location and at one interval after the time;
a priority list comprising names and identities of employees with matched competency, and with availability at other locations and at the time; and
a priority list comprising names and identities of employees with matched competencies in a peer class of competencies and a conjugate class of competencies under the hierarchy levels, and with availability at the location and at the time.

4. The RCLMS of claim 1, wherein the BCMM is further configured to assign expected proficiency levels to each of the hierarchy levels of each of the service technology areas and the product technology areas, the expected proficiency levels being indicative of expertise levels of competency expected from the employees.

5. The RCLMS of claim 1, further comprising a planning module, stored in the memory and executable by the processor, to
generate an employee profile for each employee, wherein the employee profile comprises current competencies of the employee and desired competencies to acquire by the employee based on the at least one role; and create a career progression plan for the each employee based on the set of roles, wherein the career progression plan comprises training courses, project experience and technical services required to acquire the desired competencies.

6. A computer implemented method for generating a set of priority lists of employees of an organization on a computing device having a processor, for addressing demand and supply of competencies of the employees for at least one role in the organization, the method comprising:
classifying, by the processor, a business of the organization into service technology areas and product technology areas in a database, wherein the classifying includes categorizing of the service technology areas and product technology areas into a plurality of hierarchy levels;
determining, by the processor, at least a focus area, a sub-focus area and a community as hierarchy levels for each of the service technology areas and for each of the product technology areas, wherein the employees possess competency relating to at least one of the hierarchy levels of at least one of the service technology areas and the product technology areas, wherein the determination is based on a plurality of weights and maturity levels to be acquired in each of a set of knowledge dimensions;
determining, by the processor, a set of roles in the organization, each role of the set of roles being indicative of a functional job of the employees of the organization and is associated with at least one of the service technology areas and the product technology areas;
obtaining, by the processor, a role list comprising: the at least one role, from the set of roles, for which demand and supply of competencies of the employees is to be analyzed; and
at least one service competency and at least one product competency demanded for the at least one role;
obtaining a location and a time at which the at least one role in the role list is required;
computing a Best Fitment Index (BFI) for each of the employees for the at least one role in the role list, based on:
exact matching of competencies possessed by a respective employee with the at least one service competency and the at least one product competency demanded for the at least one role;
fuzzy matching of competencies possessed by the respective employee and the at least one service competency and the at least one product competency demanded for the at least one role in at least one of a peer class of competencies and a conjugate class of competencies under the hierarchy levels wherein an equivalence is determined by performing a check of at least one of peer class and conjugate class associated with at least one service competency and the at least one product competency; and
the location and the time for the at least one role; and
identifying employees for whom the BFI is greater than a predefined minimum percentage fit;
generating the set for priority lists of the identified employees based on the BFI availability at the location, and availability at the time, for addressing the demand and the supply of competencies of the employees for the at least one role in the role list; and building a competency management framework by generating employee profiles based upon one or more user inputs to bridge a demand and supply gap;
implementing by the processor, a Lifecycle Process for each competency in each of the hierarchy levels of each of the service technology areas and the product technology areas, wherein the lifecycle process defines how the each competency is created, deployed, supported, and retired in the organization; and
generating, by the processor, an Employee Competency Menu (ECM) for each employee, wherein the ECM comprises:
a set of current competencies possessed by the each employee in at least one of the hierarchy levels of at least one of the service technology areas and the product technology areas,
a current proficiency level associated with each competency of the set of current competencies possessed by the employee, and
a proficiency weight associated with the each competency of the set of current competencies; and
calculating by the processor a Cumulative Proficiency Index (CPI) for the employee using the ECM, wherein the CPI is indicative of a depth and a breadth of the set of current competencies possessed by the employee, wherein the depth is equal to a summation of the proficiency weight associated with each of the set of current competencies, and wherein the breadth is equal to a total number of competencies in the set of current competencies.

7. The method of claim 6, further comprising:
assigning, by the processor, expected proficiency levels to each of the hierarchy levels of each of the service technology areas and the product technology areas, the expected proficiency levels being indicative of expertise levels of competency expected from the employees.

8. The method of claim 6, further comprising
assigning, by the processor, an expected maturity level in a set of knowledge dimensions for each role in the set of roles, the set of knowledge dimensions comprising at least one of a solution dimension, a technology dimension, a process dimension, and an organization dimension, and the expected maturity level being indicative of an expertise level of competency expected from an employee; and
calculating, by the processor a Role Competency Index (RCI) for each role in the set of roles, wherein the RCI is indicative of competencies and proficiency levels expected from the employees for the each role, and wherein the RCI is calculated based on a mandatory set of knowledge dimensions for the role, an additional set of knowledge dimensions for the role, a weight attached to the expected maturity levels in percentage, and the expected maturity levels in the each of the set of knowledge dimensions for the role.

9. The method of claim 6, wherein the set of priority lists comprises at least one of:
a priority list comprising names and identities of employees with matched competencies, and with availability at the location and at the time;
a priority list comprising names and identities of employees with matched competencies as per a career progression plan, and with availability at the location and at the time;

a priority list comprising names and identities of employees with matched competencies, and with availability at the location and at one interval after the time;

a priority list comprising names and identities of employees with matched competency, and with availability at other locations and at the time; and a priority list comprising names and identities of employees with matched competencies in a peer class of competencies and a conjugate class of competencies under the hierarchy levels, and with availability at the location and at the time.

10. The method of claim 6, further comprising:

generating, by the processor, an employee profile for each employee, wherein the employee profile comprises current competencies of the employee and desired competencies to acquire by the employee based on the at least one role; and creating, by the processor, a career progression plan for the each employee based on the set of roles, wherein the career progression plan comprises training courses, project experience and technical services required to acquire the desired competencies.

11. A non-transitory computer-readable medium having embodied thereon a computer program for executing a method for generating a set of priority lists of employees of an organization, for addressing demand and supply of competencies of the employees for at least one role in the organization, the method comprising:

classifying a business of the organization into service technology areas and product technology areas in a database, wherein the classifying includes categorizing of the service technology areas and product technology areas into a plurality of hierarchy levels;

determining at least a focus area, a sub-focus area and a community as hierarchy levels for each of the service technology areas and for each of the product technology areas, wherein the employees possess competency relating to the at least one of the hierarchy levels of at least one of the service technology areas and the product technology areas wherein the determination is based on a plurality of weights and maturity levels to be acquired in each of a set of knowledge dimensions;

determining a set of roles in the organization, each role of the set of roles being indicative of a functional job of the employees of the organization and is associated with at least one of the service technology areas and the product technology areas;

obtaining, a role list comprising: the at least one role, from the set of roles, for which demand and supply of competencies of the employees is to be analyzed; and at least one service competency and at least one product competency demanded for the at least one role;

obtaining a location and a time at which the at least one role in the role list is required;

computing a Best Fitment Index (BFI) for each of the employees for the at least one role in the role list, based on:

exact matching of competencies possessed by a respective employee with the at least one service competency and the at least one product competency demanded for the at least one role;

fuzzy matching of competencies possessed by the respective employee and the at least one service competency and the at least one product competency demanded for the at least one role in at least one of a peer class of competencies and a conjugate class of competencies under the hierarchy levels, wherein an equivalence is determined by performing a check of at least one of peer class and conjugate class associated with at least one service competency and the at least one product competency; and the location and the time for the at least one role; and identifying employees for whom the BFI is greater than a predefined minimum percentage fit;

generating the set for priority lists of the identified employees based on the BFI availability at the location, and availability at the time, for addressing the demand and the supply of competencies of the employees for the at least one role in the role list;

building a competency management framework by generating employee profiles based upon one or more user inputs to bridge a demand and supply gap;

implementing by the processor, a Lifecycle Process for each competency in each of the hierarchy levels of each of the service technology areas and the product technology areas, wherein the lifecycle process defines how the each competency is created, deployed, supported, and retired in the organization; and generating, by the processor, an Employee Competency Menu (ECM) for each employee, wherein the ECM comprises:

a set of current competencies possessed by the each employee in at least one of the hierarchy levels of at least one of the service technology areas and the product technology areas, a current proficiency level associated with each competency of the set of current competencies possessed by the employee, and a proficiency weight associated with the each competency of the set of current competencies; and calculating by the processor a Cumulative Proficiency Index (CPI) for the employee using the ECM, wherein the CPI is indicative of a depth and a breadth of the set of current competencies possessed by the employee, wherein the depth is equal to a summation of the proficiency weight associated with each of the set of current competencies, and wherein the breadth is equal to a total number of competencies in the set of current competencies.

* * * * *